United States Patent [19]
Hestich et al.

[11] 3,990,311
[45] Nov. 9, 1976

[54] PRESSURE GAUGE FLUSHING SYSTEM

[75] Inventors: John Hestich, Glendora; Clive J. Thompson, Alta Loma, both of Calif.

[73] Assignee: Data-Design Laboratories, Cucamonga, Calif.

[22] Filed: Feb. 13, 1976

[21] Appl. No.: 657,859

[52] U.S. Cl. ................................................ 73/418
[51] Int. Cl.² .................................................. G01L 7/04
[58] Field of Search ............ 73/412, 418, 417, 416, 73/415, 414, 413, 411, 420; 137/239

[56] References Cited
UNITED STATES PATENTS

| | | | |
|---|---|---|---|
| 519,921 | 5/1894 | McElroy | 73/412 |
| 1,322,463 | 11/1919 | Nelson | 73/411 |
| 3,530,719 | 9/1970 | Altfillisch | 73/412 |

*Primary Examiner*—Donald O. Woodiel
*Attorney, Agent, or Firm*—Harris, Kern, Wallen & Tinsley

[57] ABSTRACT

A pressure gauge having two coaxial helical bourdon tubes interconnected at the pointer ends and coupled to the pointer, with an inlet line for each tube permitting fluid flow through both tubes. A valving arrangement for operation as a pressure gauge by blocking one inlet line retaining the fluid under pressure in the tubes, and for flushing the tubes by opening both inlet lines and moving a fluid through the tubes.

7 Claims, 3 Drawing Figures

PRESSURE GAUGE FLUSHING SYSTEM

BACKGROUND OF THE INVENTION

This invention relates to pressure gauges and in particular to gauges utilizing a helical bourdon tube as the pressure responsive element. Helical bourdon tubes are highly satisfactory for measuring relatively high pressures, such as 3000 psi, while being relatively small and requiring a small volume of fluid for operation.

Gauges of this type have been suggested for use in some analytical work, such as chromatography where it is desirable that the system be cleaned after each measurement to avoid contamination of succeeding samples by the residue of prior samples.

In the past, the conventional C-shaped bourdon tube has been provided with a plug or cap at the normally closed end for purging air or for cleaning. However this type of construction requires access to the tube for plug removal and replacement, and is not satisfactory for flushing on a regular basis. Also, the C-shaped tube requires in the order of one hundred times the volume of the helical tube for the same pressure and therefore is not suitable for most analytical instruments which have relatively small samples.

Accordingly, it is an object of the present invention to provide a new and improved pressure gauge with a helical bourdon tube as the pressure responsive element and having means for flushing the interior of the gauge including the tube from the external pressure line. A further object of the invention is to provide such a gauge which is simple and rugged in design, operable at relatively high pressure and requiring a relatively small volume of fluid for the pressure measurement.

SUMMARY OF THE INVENTION

The pressure gauge of the present invention incorporates two coaxial helical bourdon tubes joined together at one end and connected to pressure lines at the other end. The gauge pointer is coupled to the interconnected tubes. For a normal operation, one of the pressure lines is blocked and the fluid is connected at the other pressure line, with the bourdon tubes being expanded by the pressure to drive the pointer to indicate the pressure of the fluid. In the flushing mode, both pressure lines are open, with a flushing fluid introduced at one line flowing through one bourdon tube, the other bourdon tube and exiting through the other pressure line. In the preferred construction illustrated, the pointer is journaled in the dial and moves coaxial with the concentric helical bourdon tubes. The dial in turn is carried on extensions of the pressure lines which pass through and are fixed in the back of the housing, with the bourdon tubes supported from the pressure lines.

DESCRIPTION OF THE PREFERRED EMBODIMENT

Figure 1:
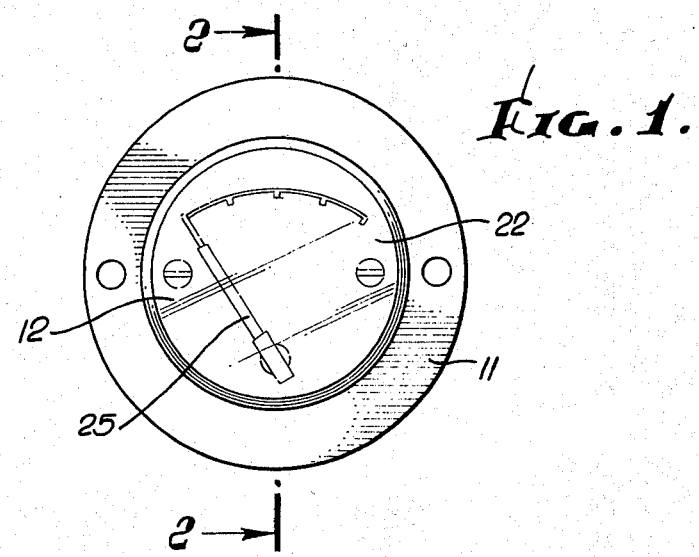
FIG. 1 is a front view of a pressure gauge incorporating the presently preferred embodiment of the invention.
Figure 2:
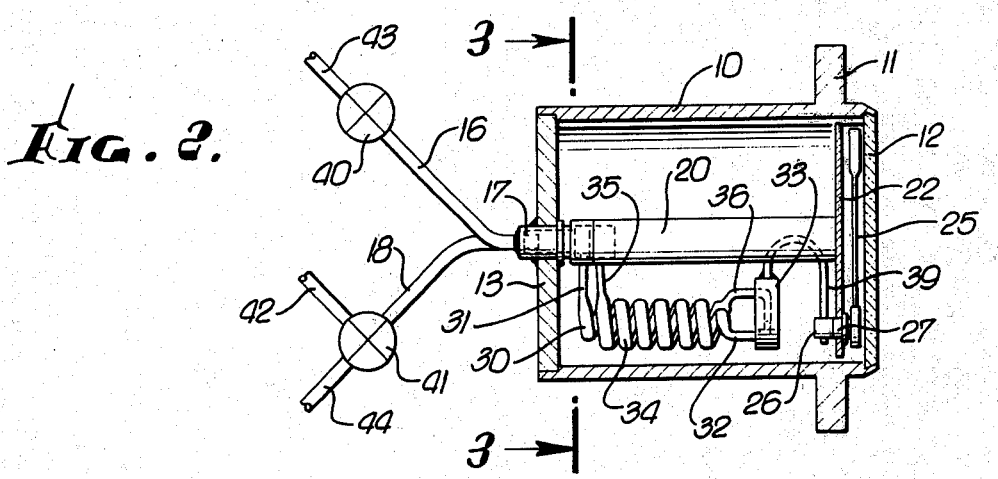
FIG. 2 is a sectional view taken along the line of 2—2 of FIG. 1.
Figure 3:
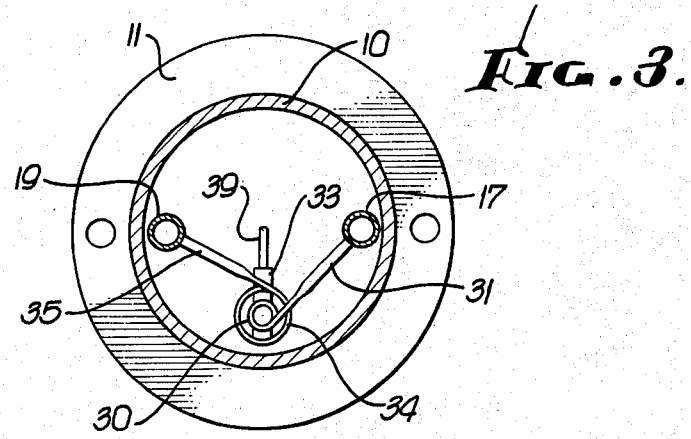
FIG. 3 is a sectional view taken along the line of 3—3 of FIG. 2.

The gauge shown in the drawing has a housing comprising case 10 with mounting flange 11, a transparent front lens 12, and a back plate 13. A line 16 is connected to a fitting 17 carried in the back plate 13, and a line 18 is similarly connected to another fitting 19. The fitting 17 has an extension 20 and the fitting 19 has a similar extension (not shown) which project toward the front of the housing and carry a dial 22.

A pointer 25 is mounted on a shaft 26 journaled in a bushing 27 in the dial 22. A helical bourdon tube 30 is connected at end 31 to the fitting 17 and at the other end 32 to a block 33. Another helical bourdon tube 34 is connected at end 35 to the fitting 19 and at the other end 36 to the block 33. The block 33 serves as a manifold providing a flow path between the two bourdon tubes. The bourdon tubes are positioned coaxial with each other and preferably concentric with each other and coaxial with the shaft 26. The block 33 is coupled to the shaft 26 by a U-shaped link 39.

A valve 40 may be positioned in the line 16 and another valve 41 may be positioned in the line 18. In operation, the valve 40 is normally in the closed position blocking fluid flow in the line 16, and the valve 41 is in a position to connect a source of fluid under pressure to the line 18, say from the line 42. The fluid at the line 42 flows through the line 18 into the tubes 30, 34 and line 16 to the valve 40 causing the two bourdon tubes to unwind and drive the pointer to a position indicating the pressure of the fluid. When it is desired to flush the gauge, the valve 40 is turned to the open position connecting the line 16 to line 43 and the valve 41 is turned to connect the line 18 to line 44. Then a flushing fluid may be connected to one of lines 43, 44 with the other line serving as a drain. The flushing fluid will flow through one of the bourdon tubes, through the block and through the other tube providing the desired flushing operation.

The pressure gauge of the invention is simple in construction yet durable and rugged, is suitable for operation at high pressure typically in the range of 0 to 3000 psi, requires a relatively small volume of fluid for operation, and is readily cleaned by flushing.

We claim:

1. In a pressure gauge, the combination of:
   a housing;
   first and second coaxial bourdon tubes, each of said tubes having first and second ends;
   manifold means interconnecting said tubes at said first ends;
   first and second pressure lines mounted in said housing, with said first tube second end connected to said first line and said second tube second end connected to said second line;
   a dial mounted in said housing;
   a pointer pivotally mounted in said housing adjacent said dial; and
   means interconnecting said manifold and pointer in driving relation.

2. A gauge as defined in claim 1 including a valve connected in one of said lines and moveable between an open position permitting fluid flow through said lines and tubes for flushing said tubes, and a closed position blocking fluid flow through said lines and tubes for pivoting said pointer as a function of the pressure in said tubes.

3. A gauge as defined in claim 2 including a second valve connected in the other of said lines and moveable between a first position for connecting a flushing fluid to said tubes, and a second position for connecting to said tubes a fluid at a pressure to be measured.

4. A gauge as defined in claim 1 wherein said pointer is mounted on a shaft journaled in said dial, with said shaft coaxial with said tubes.

5. A gauge as defined in claim 4 wherein said housing includes a back and a front, with said lines fixed in said back and having extensions projecting toward said front, with said dial carried on said line extensions.

6. A gauge as defined in claim 4 wherein said interconnecting means includes a U shaped member fixed between said manifold and shaft.

7. A gauge as defined in claim 1 wherein said bourdon tubes are helically wound in the same direction and are disposed concentric with each other.

* * * * *